United States Patent
Cheong et al.

(10) Patent No.: US 10,057,577 B2
(45) Date of Patent: *Aug. 21, 2018

(54) PRE-CHARGE PHASE DATA COMPRESSION

(71) Applicants: Hye-Yeon Cheong, Los Gatos, CA (US); Ali Tabatabai, Cupertino, CA (US)

(72) Inventors: Hye-Yeon Cheong, Los Gatos, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 14/736,597

(22) Filed: Jun. 11, 2015

(65) Prior Publication Data
US 2016/0366410 A1    Dec. 15, 2016

(51) Int. Cl.
| | |
|---|---|
| *G06T 9/00* | (2006.01) |
| *H04N 19/124* | (2014.01) |
| *H04N 19/13* | (2014.01) |
| *H04N 19/136* | (2014.01) |
| *H04N 19/184* | (2014.01) |
| *H04N 19/192* | (2014.01) |
| *H04N 19/176* | (2014.01) |
| *H04N 19/593* | (2014.01) |
| *H04N 19/146* | (2014.01) |

(52) U.S. Cl.
CPC ........... *H04N 19/124* (2014.11); *H04N 19/13* (2014.11); *H04N 19/136* (2014.11); *H04N 19/146* (2014.11); *H04N 19/176* (2014.11); *H04N 19/184* (2014.11); *H04N 19/192* (2014.11); *H04N 19/593* (2014.11)

(58) Field of Classification Search
CPC ...... H04N 19/00–19/99; H04N 5/3575; G06T 9/00–9/40
See application file for complete search history.

(56) References Cited

U.S. PATENT DOCUMENTS

| | | | | |
|---|---|---|---|---|
| 5,251,020 A | * | 10/1993 | Sugiyama | H04N 1/33307 348/E7.082 |
| 5,260,783 A | | 11/1993 | Dixit | |
| 5,631,977 A | * | 5/1997 | Koshi | G06T 9/005 382/232 |
| 5,663,764 A | * | 9/1997 | Kondo | H04N 19/63 375/240.14 |
| 5,754,698 A | * | 5/1998 | Suzuki | H04N 7/54 375/E7.026 |

(Continued)

FOREIGN PATENT DOCUMENTS

WO    2012148883 A1    11/2012

*Primary Examiner* — Sean Motsinger
(74) *Attorney, Agent, or Firm* — Trellis IP Law Group, PC

(57) ABSTRACT

Implementations generally relate to pre-charge phase data compression. In some implementations, a method includes computing prediction values for image data, where the image data is pre-charge phase data. The method also includes computing residual data based on the prediction values. The method also includes quantizing the residual data. The method also includes entropy encoding the quantized residual data. The method also includes refining an inverse quantized residual data based on one or more of the residual data and a number of left-over bit-budget after entropy encoding.

12 Claims, 7 Drawing Sheets

(56) References Cited

U.S. PATENT DOCUMENTS

| | | | | |
|---|---|---|---|---|
| 6,100,941 | A * | 8/2000 | Dimitrova | G06F 17/30814 |
| | | | | 348/700 |
| 6,963,369 | B1 * | 11/2005 | Olding | H04N 5/3575 |
| | | | | 348/222.1 |
| 7,986,731 | B2 | 7/2011 | Haskell | |
| 2003/0231252 | A1 * | 12/2003 | Findlater | H04N 5/3575 |
| | | | | 348/297 |
| 2007/0103561 | A1 * | 5/2007 | Kunieda | G11B 27/10 |
| | | | | 348/220.1 |
| 2009/0110079 | A1 * | 4/2009 | Haga | H04N 19/593 |
| | | | | 375/240.24 |
| 2010/0232691 | A1 * | 9/2010 | Sekiguchi | H04N 19/147 |
| | | | | 382/166 |
| 2014/0092986 | A1 * | 4/2014 | Chou | H04N 7/50 |
| | | | | 375/240.25 |
| 2015/0062377 | A1 * | 3/2015 | Wong | H04N 5/378 |
| | | | | 348/231.99 |
| 2016/0119570 | A1 * | 4/2016 | Wong | H04N 5/378 |
| | | | | 348/308 |
| 2016/0366410 | A1 * | 12/2016 | Cheong | H04N 19/124 |
| 2016/0366411 | A1 * | 12/2016 | Cheong | H04N 19/124 |
| 2016/0366429 | A1 * | 12/2016 | Cheong | H04N 19/176 |

* cited by examiner

200

700

PRE-CHARGE PHASE DATA COMPRESSION

BACKGROUND

Image sensors are widely used in devices such as a digital camera to produce digital images. An analog-to-digital converter (ADC) is used in an image sensor to convert analog signals into digital signals. More specifically, an ADC converts an analog pixel signal from a pixel array into digital data. Compressing techniques may be used to compress the digital data representing an image, as well as to preserve the quality of the image.

SUMMARY

Implementations generally relate to pre-charge phase data compression. In some implementations, an apparatus includes one or more processors, and includes logic encoded in one or more tangible media for execution by the one or more processors and when executed operable to perform operations including: computing prediction values for image data, where the image data is pre-charge phase data; computing residual data based on the prediction values; quantizing the residual data; entropy encoding the quantized residual data; and refining an inverse quantized residual data based on one or more of the residual data and a number of left-over bit-budget after entropy encoding.

In some implementations, software is encoded in one or more non-transitory computer-readable media for execution by the one or more processors. When executed, the software is operable to perform operations including: computing prediction values for image data, where the image data is pre-charge phase data; computing residual data based on the prediction values; quantizing the residual data; entropy encoding the quantized residual data; and refining an inverse quantized residual data based on one or more of the residual data and a number of left-over bit-budget after entropy encoding.

In some implementations, a method includes computing prediction values for image data, where the image data is pre-charge phase data. The method also includes computing residual data based on the prediction values. The method also includes quantizing the residual data. The method also includes entropy encoding the quantized residual data. The method also includes refining an inverse quantized residual data based on one or more of the residual data and a number of left-over bit-budget after entropy encoding.

A further understanding of the nature and the advantages of particular embodiments disclosed herein may be realized by reference of the remaining portions of the specification and the attached drawings.

DETAILED DESCRIPTION OF EMBODIMENTS

Implementations generally relate to a pre-charge phase data compression. As described in more detail below, implementations compress pre-charge phase (P-phase) data such as that of an area analogue-to-digital (AD) sensor.

In various implementations, an apparatus computes prediction values for image data, where the image data is P-phase data. As described in more detail below, due to the lack of spatial correlation existing in P-phase data, the apparatus uses a block average prediction value as a predictor and uses differential pulse-code modulation (DPCM) to code P-phase data.

In various implementations, the apparatus then computes residual data based on the prediction values. The apparatus also quantizes the residual data. The method also includes entropy encoding the quantized residual data. The apparatus also refines an inverse quantized residual data based on one or more of the residual data and a number of left-over bit-budget after entropy encoding. Such techniques support block level random access properties. As a result, high-gain P-phase data can be well compressed.

Figure 1:
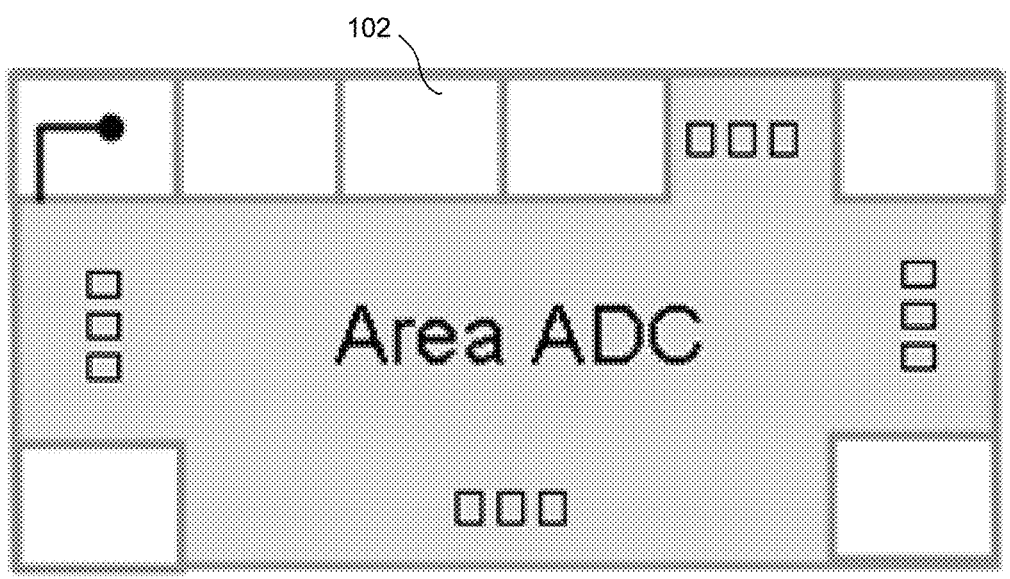
FIG. 1 illustrates a block diagram of an example area analogue-to-digital converter (ADC), which may be used for implementations described herein.

FIG. 1 illustrates a block diagram of an example area analogue-to-digital converter (ADC) 100, which may be used for implementations described herein. Area ADC 100 includes areas or blocks 102 of pixels, which generate pre-charge phase (P-phase) data and data-charge phase (P-phase) data.

In various implementations, area ADC 100 performs parallel processing in blocks 102. For ease of illustration, blocks 102 are shown as squares. In various implementations, blocks 102 may be any shape such as rectangles, circles, etc.

In various implementations, the settling time for area ADC 100 may be significantly reduced, where the settling time may be the time for the sensor to reach a stable output once it is turned on. Such reduced settling times is beneficial for high-speed cameras.

Figure 2:
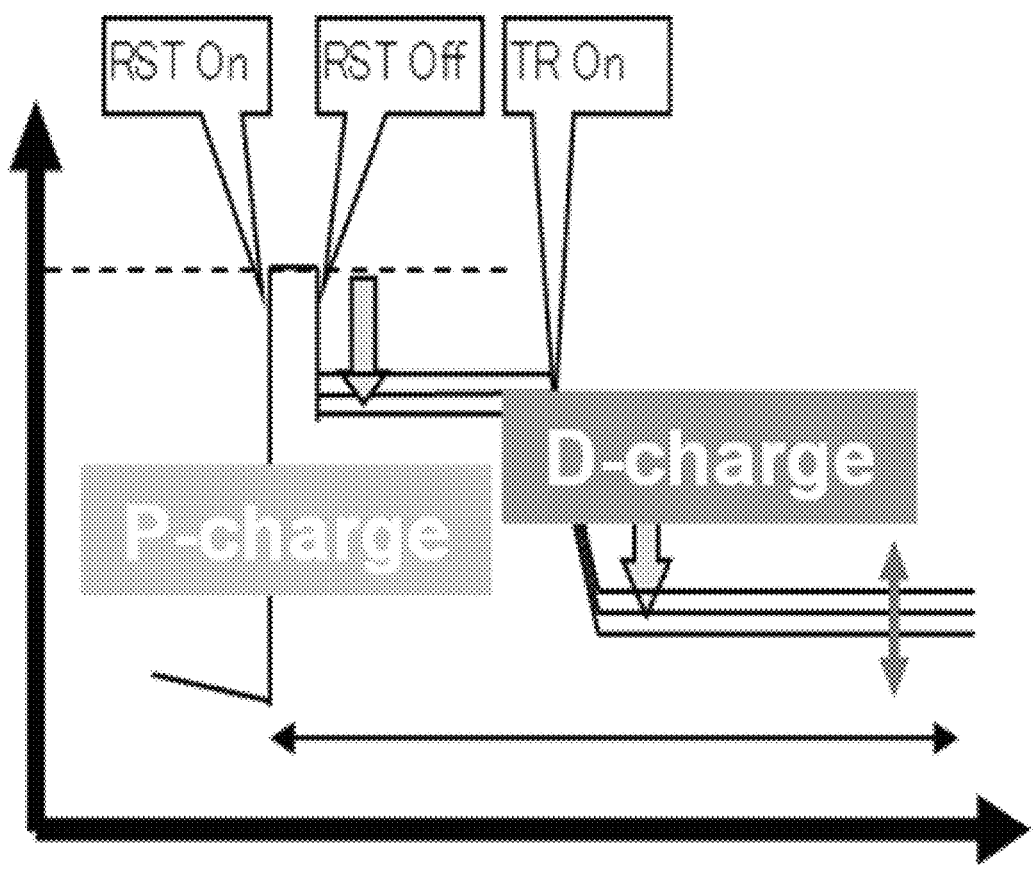
FIG. 2 illustrates an example graph diagram showing data from a correlated double sampling (CDS) based operation, according to some implementations.

FIG. 2 illustrates an example graph diagram 200 showing data from a correlated double sampling (CDS) based operation, according to some implementations. In various implementations, CDS based operations involve both P-phase data and D-phase data. Area ADC 100 performs CDS as a noise reduction technique, in which CDS data is generated from the difference between the D-phase data and the P-phase data. The CDS data reflects the canceling of noise in an image.

From a codec point of view, area ADC 100 stores P-phase data, because the timing to obtain the P-phase data and the D-phase data is different. For example, area ADC 100 obtains and stores the P-phase data. When area ADC 100 obtains the D-phase data, ADC 100 may then fetch the P-phase data and perform CDS in order to cancel noise. As described in more detail below, P-phase compression is desirable and is therefore performed.

Figure 3:
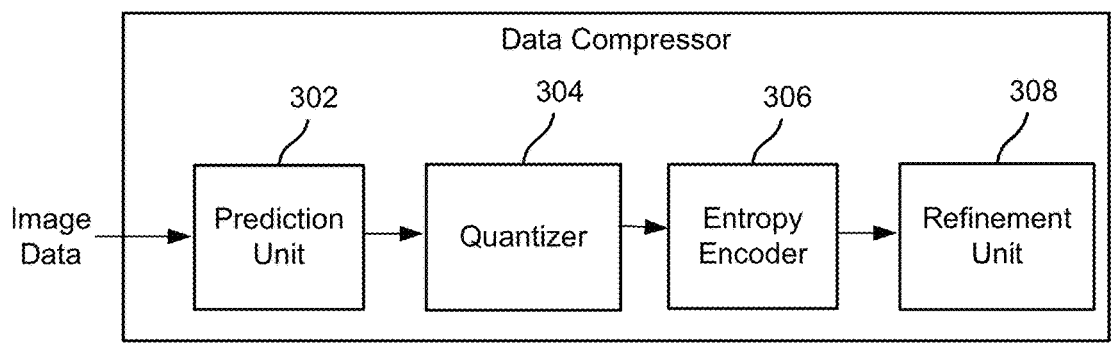
FIG. 3 is a block diagram of an example data compressor, according to some implementations.

FIG. 3 is a block diagram of an example data compressor 300, according to some implementations. In various implementations, data compressor 300 may be a part of area ADC of FIG. 1. As shown, data compressor 300 includes a prediction unit 302, a quantizer 304, an entropy encoder 306, and a refinement unit 308. Example implementations directed to operations of data compressor 300 are described in more detail below in connection with FIG. 4.

While implementations described herein may be described in the context of image data, these implementations and others also apply to non-image data. For example, P-phase data is primarily non-image data or noise. Implementations described herein may apply to compression P-phase data consisting of non-image data or noise, as well as to compression of D-phase data consisting of image data.

In various implementations, area ADC 100 may operate in two modes. The first mode, and simpler of the two modes, is referred to as pulse-code modulation (PCM). The second mode is referred to as differential pulse-code modulation (DPCM). In various implementations, a 1-bit signal (e.g., a 0 or 1 bit) indicates which mode to apply.

With regard to PCM mode, area ADC 100 sends each bit-plane in an order from the most significant bit (MSB) to least significant bit (LSB), until all of the bit-budget is used. In some implementations, area ADC 100 may perform middle point reconstruction of un-coded bits. In some implementations, PCM mode may be applied to a random access (RA) pixel array, where each block is randomly accessed. In other words, each block may be accessed independently, and independently encoded and/or decoded, where there are no dependencies on surrounding blocks.

In an example implementation, a given pixel block is an 8×1 block, or 8×1 pixels. The pixel block may be any size (e.g., 4×4, etc.). In this example, the block is 8×1 pixels. In this example, for each of 8 pixels, there is a 12-bit depth (bit plane). Each pixel is 12 bits and is to be compressed to 6 bits, but may be compressed to any other number of bits (e.g., 4 bits, etc.), depending on the particular implementation.

If there is a need to code from 12 bit depth to 6 bit depth, 8×12 or 96 bits per sample becomes 8×6 or 48 bits per sample. As a result, an 8×1 block would be coded with 48 bits (instead of 96 bits).

In some implementations, area ADC 100 first computes the bit budget. With a 48-bit budget, one bit is used for indicating PCM mode. As such, in this example, there remain 47 bits. Area ADC 100 then removes the header bit. Area ADC 100 then codes each block from MSB to LSB until the bit budget is used up. In some implementations, area ADC 100 then performs middle-point reconstruction in order to minimize errors.

Example implementations of the DPCM mode are described in more detail below in connection with FIG. 4.

Figure 4:
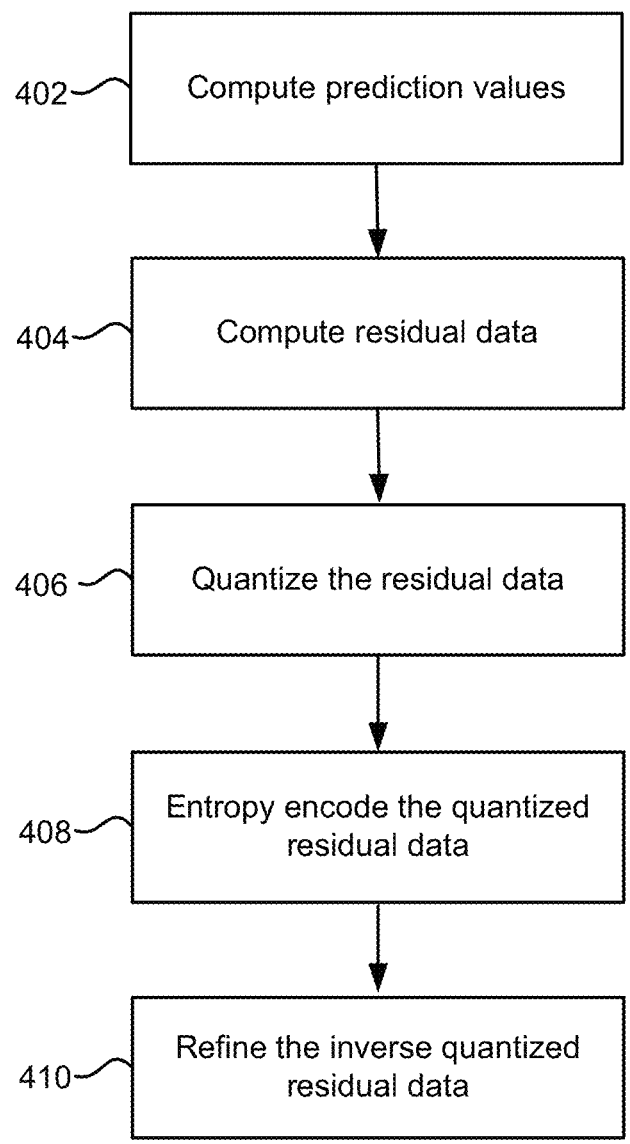
FIG. 4 illustrates an example flow diagram of a method for compressing image data, according to some implementations.

FIG. 4 illustrates an flow diagram of an example method for compressing image data, according to some implementations. Referring to both FIGS. 3 and 4, the method is initiated in block 402, where data compressor 300 computes prediction values for image data, where the image data is pre-charge phase data, and the image data is P-phase data. In various implementations, the image data is partitioned into blocks. In various implementations, data compressor 300 computes the prediction values for each block of the image data.

Figure 5:
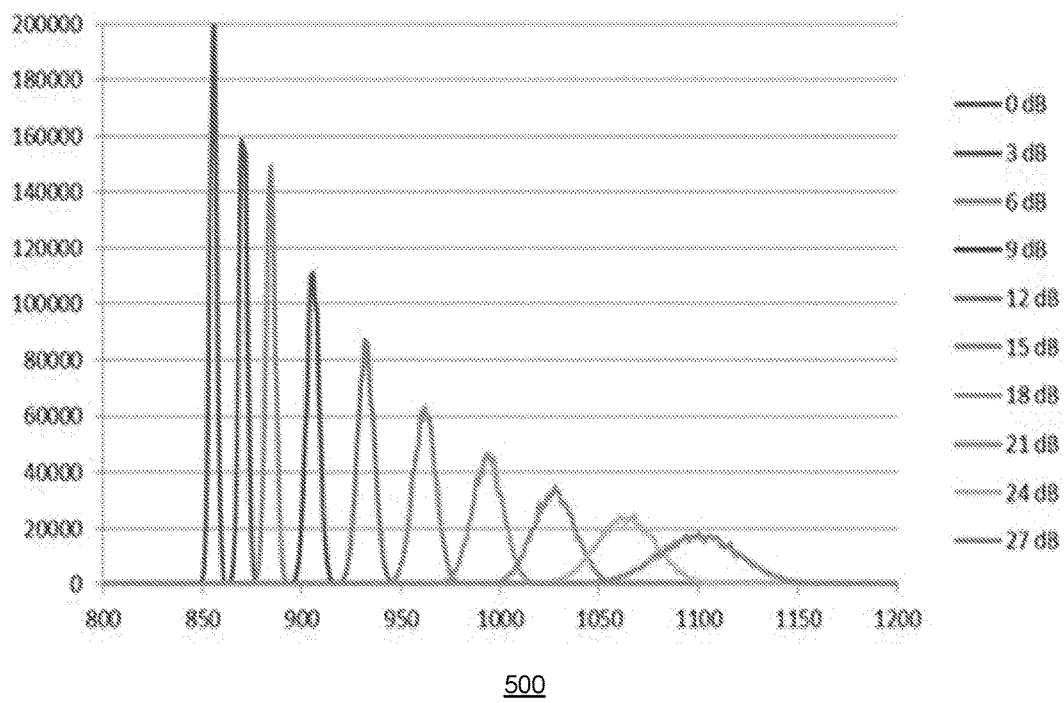
FIG. 5 illustrates an example graph diagram showing distributions of pre-charge (P-phase) data, according to some implementations.

FIG. 5 illustrates an example graph diagram 500 showing distributions of P-phase data, according to some implementations. Graph diagram 500 shows distribution characteristics of P-phase data, where different data received has different gain values. For example, gain values may include 0 decibels (dB), 3 dB, 6 dB, 9 dB, 12 dB, 15 dB, 18 dB, 21 dB, 24 dB, 27 dB, etc. P-phase data is primarily noise such as thermal noise. In various implementations, P-phase data may be modeled as a Gaussian noise.

As shown, the data distribution is space-invariant. In other words, P-phase data has little if any spatial correlation. Being primarily noise, different portions of the image look visually substantially the same. As such, the image associated with P-phase data may also be referred to as a non-image or noise. Also, as shown, both mean and variance of noise increase with gain (dB). Implementations described herein are effective in compressing P-phase data in lieu of some spatial prediction based DPCM methods, which might not be effective.

Referring again to FIG. 4, in block 404, data compressor 300 computes residual data based on the prediction values. In some implementations, data compressor 300 determines a block average prediction value based on the computed prediction values. In various implementations, due to the lack of spatial correlation existing in P-phase data, data compressor 300 uses a block average prediction value as a predictor, and uses DPCM to code P-phase data. Such techniques also support block level random access properties. As a result, high-gain P-phase data can be well compressed in order to reduce bandwidth, especially for high frame rates. For example, implementations can compress high-gain P-phase data of 12 bits per second (bps) to 4 bps compression well.

In various implementations, data compressor 300 computes the residual data based on the determined block average prediction value. In some implementations, data compressor 300 may use two methods or techniques, for computing the residual data based on the determined block average prediction value. In various implementations, to compute the residual data, data compressor 300 subtracts the block average prediction value from each block.

With regard to the first technique, in some implementations, data compressor 300 computes the block average prediction value for each block. This technique may be referred to as a local block average technique.

In various implementations, data compressor 300 computes the block average prediction value, which is sent in the bitstream. In various implementations, the block average prediction value may be computed and sent in full bit-depth or smaller bit-depth or quantization step size dependent bit-depth.

In some implementations, data compressor 300 computes a prediction value for an example pixel (e.g., 8 values). Data compressor 300 then computes the average prediction value of the block (e.g., the average of 8 values for 8 pixels). Data compressor 300 then subtracts the average prediction value (e.g., 100) from the sample value of each pixel of the block. For example, if the sample value for a given pixel is 32, and the average prediction value for the block is 100, data compressor 300 subtracts 100 from 32 (e.g., 32−100) to get a resulting residual value (e.g., −68). If the prediction value for another pixel in the same block is 150, data compressor 300 subtracts 100 from 150 (e.g., 150−100) to get a resulting residual value (e.g., 50). These residual values constitute the residual data for a given block. As described in more detail below, after computing the residual data, data compressor 300 then proceeds to quantize the residual data.

With regard to the second technique, in some implementations, the block average prediction value is predetermined for all blocks. This technique may be referred to as a global block average technique. As indicated herein, P-phase is typically space invariant. In various implementations, for P-phase data, data compressor 300 computes the block average prediction value, which tends to be more or less the same for all blocks. As such, a block average may be treated as a global average. As such, the block average prediction value of all of the P-phase data can be stored and used as a constant. The block average prediction value changes depending on the gain (dB) of the P-phase data. Since the block average prediction value is a constant stored at both the encoder and the decoder, block average prediction value need not be sent in the bitstream.

In block 406, data compressor 300 quantizes the residual data. In various implementations, data compressor 300 quantizes the residual image data based on a quantization value. In various implementations, data compressor 300 determines the quantization parameter at the mode decision process sent in the bitstream. In some implementations, there are two possible techniques, which are described in more detail below.

With regard to the first technique, in some implementations, data compressor 300 selects a predetermined quantization value (qn). Various implementations are possible. For example, in some implementations the quantization value may be based on a predetermined bit-depth. In some implementations, data compressor 300 may select the quantization value from a set of quantization values ranging from a predetermined number (e.g., 0, 1, 2, etc.) to a predetermined bit-depth. For example, if the predetermined bit depth is 12, the quantization value may be 0 to 11 (12 possible quantization values). In another example implementation, the quantization value may be based on a Q step size of $2^n$, where n=1, 2, 3, 4, etc. In some implementations, there may be 4 bits to signal the quantization value in the header. In some implementations, data compressor 300 tests for different quantization values.

With regard to the second technique, in some implementations, data compressor 300 selects the quantization value from one or more predetermined quantization values. For example, there may be 1 or 2 quantization values that are most often chosen. Such quantization values may change depending on the gain (dB) of the P-phase data. The mode decision may compare these 2 predetermined (P-phase gain dependent) quantization values. As such, this technique simplifies the mode decision process. Also, only 1 bit is needed to signal the quantization value in the header.

In block 408, data compressor 300 entropy encodes the quantized residual data. In some implementations, data compressor 300 performs entropy encoding based on Golomb coding (e.g., Golomb-2 coding). Other entropy coding may be used, depending on the particular implementation.

In block 410, data compressor 300 refines the inverse of the quantized residual data. In some implementations, data compressor 300 refines the inverse quantized residual data based on one or more of the residual data and the number of left-over bit-budget after entropy encoding. For example, in some implementations, data compressor 300 performs middle point reconstruction and adds the residual data to the prediction values.

Figure 6:
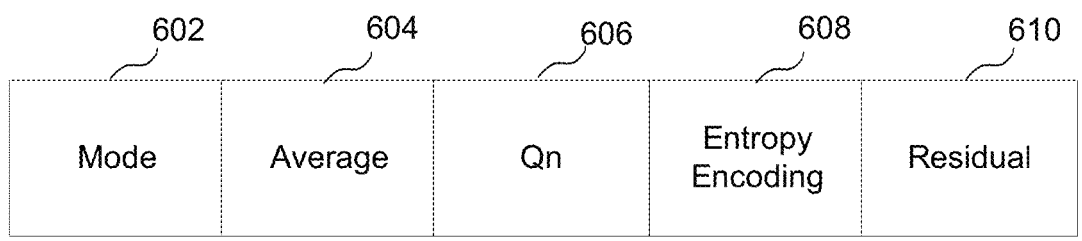
FIG. 6 illustrates an example bitstream structure, according to some implementations.

FIG. 6 illustrates an example bitstream structure 600, according to some implementations. In various implementations, bitstream structure 600 is used for DPCM mode, where various values described above are sent in the bitstream in bitstream structure 600. As shown, a mode field 602 (labeled "Mode") stores a 1-bit signal (e.g., 0 or 1) that indicates whether to use PCM or DPCM. A block average value field 604 (labeled "Average") stores a block average prediction value. A quantization field 606 (labeled "Qn") stores a quantization value. An entropy encoding field 608 stores entropy encoding values. A residual field 610 (labeled "Residual") stores residual data.

In various implementations, bitstream structure 600 is based on sub-sampled image data. Also, scan order may be variable, and a uniform scan is desirable between all areas.

While data compressor 300 is described as performing the steps as described in the implementations herein, any suitable component or combination of components of area ADC 100 or any suitable processor or processors associated with area ADC 100, and/or data compressor 300, and/or any suitable system may perform the steps described.

Figure 7:
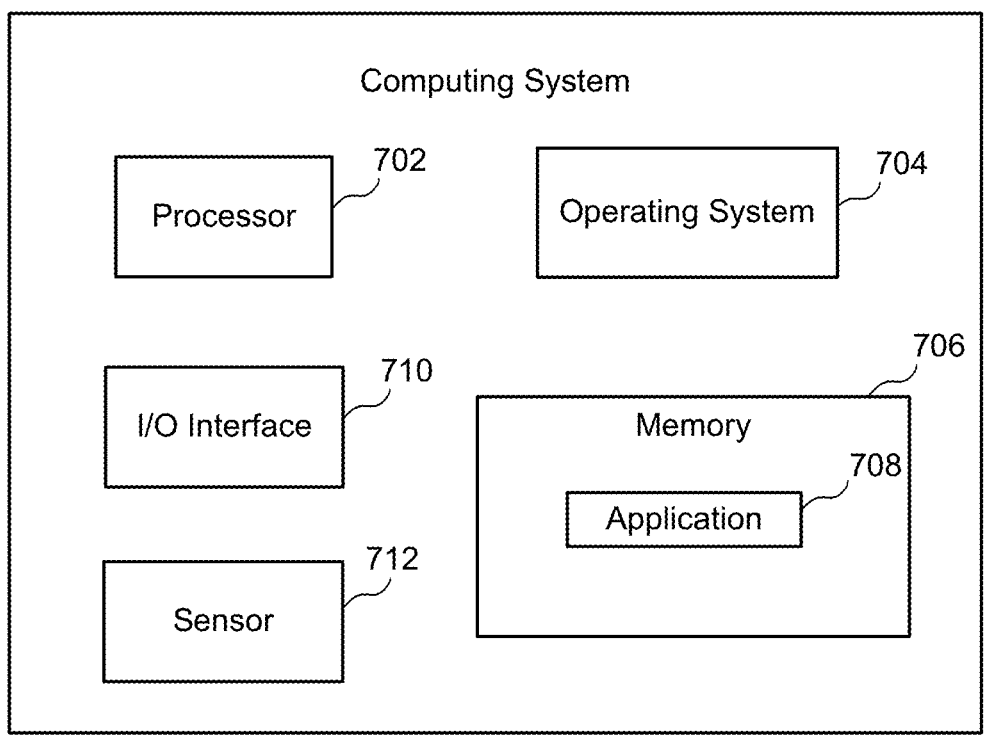
FIG. 7 illustrates a block diagram of an example computing system, which may be used for implementations described herein.

FIG. 7 is a block diagram of an example computing system 700, which may be used for implementations described herein. For example, computing system 700 may be used to implement area ADC 100 of FIG. 1 or any other associated devices. In some implementations, computing system 700 may include a processor 702, an operating system 704, a memory 706, an input/output (I/O) interface 710, and sensor 712. A software application 708 may be stored on memory 706 or on any other suitable storage location or computer-readable medium. Software application 708 provides instructions that enable processor 702 to perform the functions described herein. In other embodiments, computing system 700 may not have all of the components listed and/or may have other components instead of, or in addition to, those listed above. The components of computing system 700 may be implemented by one or more processors or any combination of hardware devices, as well as any combination of hardware, software, firmware, etc.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. An apparatus comprising:
   one or more processors; and
   logic encoded in one or more tangible media for execution by the one or more processors and when executed operable to perform operations including:
   computing prediction values for image data, wherein the image data is pre-charge phase data;
   computing residual data based on the prediction values;
   determining a average prediction value based on the prediction values, wherein the average prediction value is computed for each block;
   computing the residual data based on the average prediction value;
   quantizing the residual data, wherein the quantizing of the residual data is based on a quantization value;
   entropy encoding the quantized residual data; and
   refining an inverse quantized residual data based on the residual data and a number of left-over bit-budget after entropy encoding.

2. The apparatus of claim 1, wherein one or more of the processors are implemented in an image sensor.

3. The apparatus of claim 1, wherein the logic when executed is further operable to perform operations comprising:
   performing middle point reconstruction and adds the residual data to the prediction values.

4. The apparatus of claim 1, wherein the quantization value is selected from one or more predetermined quantization values.

5. The apparatus of claim 1, wherein the entropy encoding is based on Golomb coding.

6. Software encoded in one or more non-transitory computer-readable media for execution by one or more processors and when executed operable to perform operations comprising:
   computing prediction values for image data, wherein the image data is pre-charge phase data;
   computing residual data based on the prediction values;
   determining a average prediction value based on the prediction values, wherein the average prediction value is computed for each block;
   computing the residual data based on the average prediction value;
   quantizing the residual data, wherein the quantizing of the residual data is based on a quantization value;
   entropy encoding the quantized residual data; and
   refining an inverse quantized residual data based on the residual data and a number of left-over bit-budget after entropy encoding.

7. The software of claim 6, wherein the logic when executed is further operable to perform operations comprising:
   performing middle point reconstruction and adds the residual data to the prediction values.

8. The software of claim 6, wherein the quantizing of the residual data is based on a quantization value, and wherein the quantization value is selected from one or more predetermined quantization values.

9. The software of claim 6, wherein the entropy encoding is based on Golomb coding.

10. A computer-implemented method comprising:
    computing prediction values for image data, wherein the image data is pre-charge phase data;
    computing residual data based on the prediction values;
    determining a average prediction value based on the prediction values, wherein the average prediction value is computed for each block;
    computing the residual data based on the average prediction value;
    quantizing the residual data, wherein the quantizing of the residual data is based on a quantization value;
    entropy encoding the quantized residual data; and
    refining an inverse quantized residual data based on the residual data and a number of left-over bit-budget after entropy encoding.

11. The method of claim 10, wherein the logic when executed is further operable to perform operations comprising:
    performing middle point reconstruction and adds the residual data to the prediction values.

12. The method of claim 10, wherein the quantization value is selected from one or more predetermined quantization values.

* * * * *